ically results in metallizations of 80% or less. These processes generally utilize temperatures of 1200° to 1400° F. and use hydrogen or carbon monoxide as the reducing gases. The gases are generally produced by partially oxidizing gaseous or liquid hydrocarbon feeds with oxygen or steam. The resulting gases are preheated to reducing temperatures and passed through a series of fluid beds in which the ore is progressively reduced. Generally a series of fluid beds are used with the ore flowing countercurrent to the reducing gas. It is necessary to employ a plurality of fluid beds so that the ore will be fully reduced before being removed from the system.

United States Patent

Bessant

[15] 3,637,368

[45] Jan. 25, 1971

| [54] | INCREASED METALLIZATIONS OF IRON ORE FROM FLUIDIZED BED PROCESSES |
|---|---|
| [72] | Inventor: Glyndwr A. R. Bessant, Baytown, Tex. |
| [73] | Assignee: Esso Research and Engineering Company |
| [22] | Filed: Oct. 16, 1968 |
| [21] | Appl. No.: 768,162 |
| [52] | U.S. Cl..................................................75/26, 75/34 |
| [51] | Int. Cl.................................C22b 1/02, C21b 13/14 |
| [58] | Field of Search............................................75/26, 4, 34 |
| [56] | References Cited |
|  | UNITED STATES PATENTS |
| 1,864,593 | 6/1932 Gustafsson...................................75/34 |
| 2,894,831 | 7/1959 Old................................................75/26 |
| 3,028,231 | 4/1962 Klemantaski.................................75/26 |
| 3,022,156 | 2/1962 Eastman.......................................75/26 |
| 3,392,008 | 7/1968 Ward............................................75/34 |

*Primary Examiner*—Winston A. Douglas
*Assistant Examiner*—Peter D. Rosenberg
*Attorney*—Manahan and Wright

[57] ABSTRACT

Improved iron ore metallizations are achieved by reducing the ore in fluidized processes, depositing carbon on the ore and then gasifying the carbon at low pressures.

7 Claims, No Drawings

INCREASED METALLIZATIONS OF IRON ORE FROM FLUIDIZED BED PROCESSES

BACKGROUND OF THE INVENTION

This invention relates to the reduction of particulate iron ore in fluidized beds. More particularly, it relates to a process for increasing the metallization of the reduced ore product from fluidized bed reduction processes.

It is known to reduce oxidic iron ores in fluidized beds. In a typical such process, the ore is ground to fluidizable particle sizes ranging generally between about 10 and about 10,000 microns, and averaging about 50 to about 200 microns in size. The finely ground ore is introduced into beds or stages and fluidized by upwardly flowing reducing gases at sufficiently high temperatures to reduce the oxidic ores to metallic iron. In preferred processes, the ore is reduced in multiple stages by countercurrent contact with reducing gases at temperature generally ranging from about 1,000° to about 1,800° F. In the initial stage the ore is preheated, or preheated and partially reduced from $Fe_2O_3$ to a state of oxidation between $Fe_2O_3$ and FeO. In subsequent beds the preheated ore is progressively reduced first to FeO and then to mixtures of FeO and metallic Fe, and finally to a product comprising principally metallic iron.

The reducing gases used in fluidized iron ore reduction processes may include any conventional reducing gases such as hydrogen, carbon monoxide, or mixtures of these and other gases, including inert gases such as nitrogen. In the course of the reduction, hydrogen is converted to $H_2O$ and carbon monoxide is converted to carbon dioxide. In a multistage reduction process, the reducing gases are generally introduced into the final reduction stage, known as the ferrous reduction stage, wherein ferrous oxides, i.e., FeO, are reduced substantially to metallic iron. The gases are partially oxidized in the final ferrous stage and ascend to the next higher stage and are ultimately removed from the uppermost stages of the ore reduction process. The spent reducing gases contain substantial amounts of unreacted hydrogen, carbon monoxide, or both, and these are generally recovered by removal of oxidized constituents. The recovered gases are reheated and recycled for further use in the process. It is also known to introduce hydrocarbons directly into the final ferrous reduction stage of a multistage process to generate reducing gases in situ. For example, when methane, $CH_4$, is introduced into a bed of ferrous oxide and metallic iron at high temperatures, it reacts and forms CO and $H_2O$, while simultaneously reducing the ferrous oxide to iron.

The reducibility of particulate oxidic iron ores, i.e., the ease with which they are reduced in a fluidized bed process, varies somewhat from ore to ore. For example, certain ores, such as Cerro Bolivar, from South America, can be relatively easily reduced in fluidized bed processes having the ferrous reduction stages maintained at relatively high temperatures ranging from about 1,300° to about 1,600° F. Other ores are reduced with greater difficulty and may tend to reach a threshold level of metallization beyond which reduction progresses only with great difficulty. Using some ores, such as Alegria from South America, or Lamco, from Liberia, it is only with great difficulty that the ores can be reduced to metallizations above about 92 percent, and even then such reduction requires very long holding times for the ore in the ferrous reduction stages. This, however, is highly uneconomical and it has long been felt desirable to design a process for achieving higher metallizations of product than those which are conventionally obtained in economical holding times in conventional fluidized bed processes.

SUMMARY OF THE INVENTION

In accordance with the present invention, oxidic iron ore is reduced in steps to higher metallizations than can be achieved in conventional fluidized iron ore reduction processes. This invention contemplates reducing the particulate ore in a staged fluidized bed process to the highest metallization which can be achieved with relative ease, depositing carbon upon the surfaces of the ore particles at high pressures and temperatures, lowering the pressure and gasifying the carbon to form carbon monoxide while reducing additional ferrous oxide to metallic iron.

The initial reduction of the ore in the fluidized beds is achieved at temperatures in the final ferrous reduction stage of about 1,300° to 1,600° F. Carbon is deposited on the ore, preferably in the final ferrous reduction stage, by injecting carbon-forming gases into said stage at conditions conducive to the deposition of carbon. The gas injection can comprise the addition of a light hydrocarbon such as methane, naphthas, natural gas, or even intermediate hydrocarbons, such as gas oils, and the like, which break down, crack, or otherwise liberate free carbon at the temperatures and conditions in the final ferrous reduction stage. Alternatively, reducing gases containing carbon monoxide may be used in the final ferrous reduction stage, and the carbon monoxide may itself liberate free carbon according to the reaction:

$$2 CO \rightarrow C + CO_2$$

It is desirable to maintain high ratios of carbon monoxide to carbon dioxide in the final ferrous reduction stage in order to achieve the highest metallizations feasible. Generally, the mole ratio of carbon monoxide to carbon dioxide in the reducing gas fed to the ferrous reduction zone is at least 10 and preferably ranges from about 15 to 20. At temperatures in the 1,300° to 1,600° F. range in the final ferrous reduction stage, it is essential to maintain total system pressures of at least about 5 atmospheres and preferably about 8 to about 20 atmospheres. Under these conditions carbon deposition can be controlled to obtain a reduced iron ore product containing at least about 1 percent carbon and preferably about 1.5 percent to 3 percent carbon, based on weight of total reduced ore product, in economically feasible holding times.

Whatever the method used for depositing carbon on the reduced ore, it is desirable first to reduce the ore to the lowest feasible state of oxidation to which it can be readily reduced prior to the removal of the product from the reactor. Ordinarily, the ore should be initially reduced to above about 85 percent metallization, and preferably about 88 percent to 92 percent metallization, before it is withdrawn from the final reduction stage. The term "metallization" means the percentage of total iron present as metallic Fe. After the ore is reduced and carbon is deposited, the carbon coated particles are withdrawn from the final reduction stage and maintained at temperatures of at least about 1,200° F. and preferably about 1,350° to 1,600° F., while lowering the pressure to below about 3 atmospheres, and preferably below about 2 atmospheres. It is believed that when the pressure is lowered at sufficiently high temperatures, the carbon reacts with part of the remaining unreduced or partially reduced ore according to the reaction:

$$C + FeO \rightarrow CO + Fe,$$

this increasing the metallization of the product. The CO generated by this reaction can then produce additional iron according to the reaction:

$$CO + FeO \rightarrow CO_2 + Fe.$$

Moreover, the carbon also reacts with any $CO_2$ or $H_2O$ present to produce additional CO and $H_2$ reducing gases in accordance with the reactions:

$$C + CO_2 \rightarrow 2CO$$
$$C + H_2O \rightarrow H_2 + CO.$$

In order to achieve significant improvements in the metallization, it is important to maintain the carbon coated particles at temperatures at least above about 1,200° F., and preferably about 1,350° to 1,600° F., after the pressure is lowered for a time of at least about 5 minutes, and preferably about 15 minutes to 2 hours, to permit the additional reduction reactions to occur. Excessive air or oxygen should be excluded from contact with particles at these conditions to prevent combustion of the carbon and back-oxidation of the reduced ore.

DESCRIPTION OF THE PREFERRED EMBODIMENTS

In accordance with the preferred modes of operation of this invention, a sample of Lamco ore from Liberia is crushed in a conventional ball mill to particle sizes ranging less than about 14 mesh (Tyler) screen size and averaging about 125 microns in size. The ore is reduced in a multistage fluidized bed reactor containing at least three stages. In the initial stage the ore is reduced to compositions approximating $Fe_3O_4$ and in the subsequent stages the prereduced material is reduced through ferrous oxide to form a composition comprising principally metallic iron and ferrous oxide having a metallization of about 90 percent.

A reducing gas comprising about 25% CO, 45% $H_2$, 1.5% $CO_2$, based on volumes, and the remainder nitrogen, is introduced into the bottom or final ferrous reduction stage at a temperature of about 1,450° F. The exothermic reversion reaction produces sufficient heat to maintain the temperature in said final stage at about 1,500° F. The total pressure in the final reduction stage is maintained at about 8 atmospheres. Under these conditions, about 2 wt. percent carbon is deposited on the surfaces of the reduced ore particles during a holding time in the final stage of about 30 minutes. The carbon coated product is withdrawn from the reactor through a nonfluidized line having a length of about 100 feet, through which the pressure drops to atmospheric, and is discharged into a receiving vessel maintained at atmospheric pressure. The temperature of the carbon coated particles is maintained at above about 1,400° F. throughout the passage of the ore through the nonfluidized line and in the receiving vessel. Samples are taken from the receiving vessel and compared with samples of ore taken directly from the final reduction stage. A comparison shows that a portion of the carbon has gasified and increased the metallization from about 90 to about 92 percent. The total average time required for the passage of the ore through the nonfluidized withdrawal line and receiving vessel is about 15 minutes.

In general, it is found that the higher the temperature at which the carbon coated particles is maintained, the lower the required time to react the carbon and increase the metallization. Thus, at temperatures as high as about 1,600° F. significant increases in metallization can be achieved in times as low as about 5 minutes, while at low temperatures, e.g., 1,200° F., it is required to maintain the carbon coated particles on temperature for times up to as much as about 2 hours, or even longer, in order to achieve significant increases in metallization. Moreover, where the pressure is not lowered to atmospheric pressure but is maintained at pressure intermediate the reactor pressure and atmospheric pressure, the gasification time for the carbon increases. Thus, it is preferred to lower the pressure as low as feasible.

Deposition of carbon by the reversion reaction, $2CO \rightarrow C + CO_2$, depends upon the temperature, pressure, and partial pressures of carbon monoxide and carbon dioxide. At temperatures below about 850° F., the kinetics of the carbon monoxide reversion reaction are so slow that carbon deposition is generally nil. At very high temperatures, i.e., above about 1,600° F., the equilibrium for the reversion reaction shifts so far to the left that reversion is achieved only at very high pressures or carbon monoxide concentrations.

For any given set of conditions, the temperature above which reversion can be achieved can be determined from equilibrium considerations. Thus, at equilibrium carbon formation by the reversion reaction will be governed according to the equation:

$$P_{CO_2}/(P_{CO})^2 = K$$

where $P_{CO_2}$ and $P_{CO}$ are the carbon dioxide and carbon monoxide partial pressures respectively and $K$ is the thermodynamic equilibrium constant. In terms of molar concentrations, this reduces to:

$$Y_{CO_2}/(Y_{CO})^2 P_T = K$$

where $Y_{CO_2}$ and $Y_{CO}$ are the respective mole fractions of carbon dioxide and carbon monoxide and $P_T$ is the total system pressure. Thus, carbon monoxide reversion will tend to occur only at temperatures for which $K$ is greater than:

$$Y_{CO_2}/(Y_{CO})^2 P_T$$

Values of $K$ at various temperatures which may be involved in fluidized iron ore reduction processes are shown below:

| $T$, °F. | $K$, Atm.$^{-1}$ |
|---|---|
| 1100 | 13.0 |
| 1200 | 2.8 |
| 1300 | 0.83 |
| 1600 | 0.04 |

In another variation of the invention, the reduced ore particles can be discharged from the reactor without first being coated with carbon into an intermediate vessel maintained under carbon-depositing conditions. Increased metallizations can then be achieved by coating the particles in the intermediate vessel, transferring them to a low pressure receiving vessel wherein the carbon is gasified by maintaining the temperature therein at appropriately high temperatures. The contents of the receiving vessel can be maintained at high temperatures, e.g., by keeping the coated particles fluidized with hot inert or reducing gases, or even by using mildly oxidizing gases to generate heat of reaction to compensate for the cooling effect of the endothermic reduction reaction.

Many other variations will be apparent to those skilled in the art and it is intended that the full scope and spirit of the invention be given to the attached claims.

What is claimed is:

1. A process for increasing the metallization of particulate iron ore that has been reduced in a staged fluidized reduction process to a metallization of about 85 to about 92 percent comprising:
   injecting carbon forming gases into a fluid bed of said iron ore at temperatures ranging from about 1,300° to about 1,600° F. and at a pressure ranging above about 5 atmospheres to deposit carbon on said particles; and,
   subsequently lowering said pressure to below about 3 atmospheres at temperatures above about 1,200° F. whereby said carbon interacts with at least a portion of said iron oxides remaining in said ore to produce additional metallic iron.

2. A process according to claim 1 wherein said carbon forming gas is a carbon monoxide containing gas.

3. The process of claim 1 wherein said carbon is deposited on the ore in a final ferrous reduction zone of a fluidized iron ore reduction process in amounts ranging at least about 1 wt. percent.

4. The process of claim 3 wherein said carbon is deposited by reversion of carbon monoxide.

5. The process of claim 1 wherein said pressure below about 3 atmospheres is maintained for a time ranging at least about 5 minutes.

6. The process of claim 1 wherein said pressure is lowered and maintained for a time ranging from about 15 minutes to about 2 hours below about 2 atmospheres at temperatures ranging about 1,350° to about 1,600° F.

7. The process of claim 1 wherein said carbon is deposited in said final ferrous reduction zone of a fluidized iron ore reduction process in amounts ranging from about 1.5 to about 3 percent, based on weight of total reduced ore product.

* * * * *

UNITED STATES PATENT OFFICE
CERTIFICATE OF CORRECTION

Patent No. 3,637,368  Dated January 25, 1971

Inventor(s) Glyndwr A. R. Bessant

It is certified that error appears in the above-identified patent and that said Letters Patent are hereby corrected as shown below:

On the first page, the issue date appearing after "[45]" should read -- Jan. 25, 1972 --. Cancel the sheet of drawing bearing Patent No. 3,637,368.

Signed and sealed this 31st day of October 1972.

(SEAL)
Attest:

EDWARD M. FLETCHER, JR.  ROBERT GOTTSCHALK
Attesting Officer  Commissioner of Patents

PO-1050
(5/69)

UNITED STATES PATENT OFFICE
CERTIFICATE OF CORRECTION

Patent No. 3,637,368      Dated January 25, 1972

Inventor(s) Glyndwr A. R. Bessant

It is certified that error appears in the above-identified patent and that said Letters Patent are hereby corrected as shown below:

Column 3, lines 48 and 49, cancel the phrase "but is maintained at pressure intermediate the reactor pressure" first occurrence.

Column 3, line 57, the equation should read -- $\dfrac{P_{CO_2}}{(P_{CO})^2} = K$ --

Column 3, line 69, should read -- where $P_{CO_2}$ and $P_{CO}$ --.

Column 4, line 4, the equation should read -- $\dfrac{Y_{CO_2}}{(Y_{CO})^2} = P_T = K$ --.

Column 4, line 5, should read -- where $Y_{CO_2}$ and $Y_{CO}$ --.

Column 4, line 9, should read -- $\dfrac{Y_{CO}}{(Y_{CO})^2 P_T}$ --.

Signed and sealed this 13th day of November 1973.

(SEAL)
Attest:

EDWARD M. FLETCHER, JR.
Attesting Officer

RENE D. TEGTMEYER
Acting Commissioner of Patents